United States Patent Office 2,758,137
Patented Aug. 7, 1956

2,758,137

PREPARATION OF META-NITRO-BENZYL CHLORIDES

Saul R. Buc, Easton, Pa., assignor to General Aniline & Film Corporation, New York, N. Y., a corporation of Delaware No Drawing. Application March 20, 1952, Serial No. 277,739

5 Claims. (Cl. 260—646)

This invention relates to a process for preparing meta-nitro-benzyl chlorides by reacting two mols of the corresponding nitro aromatic compound with about one mol of substantially pure bischloromethyl ether in the presence of 85 to 100% sulfuric acid.

It has been indicated heretofore that in the reaction of a crude bischloromethyl ether with aromatic compounds, the use of about 85 to 100% sulfuric acid should be avoided, since the presence of this acid results in the formation of large quantities of undesirable diphenyl methane type by-products. It has also been indicated heretofore that such a reaction may be carried out in the presence of oleum; however, in actual tests it has been found that the reaction does not proceed when substantially pure bischloromethyl ether is used in the presence of oleum.

It has been found in accordance with the invention that meta-nitro-benzyl chlorides may be prepared in a convenient manner with very good yields by reacting about two mols of the corresponding nitro aromatic compounds with about one mol of substantially pure bischloromethyl ether in the presence of 85 to 100% sulfuric acid.

The objects achieved in accordance with the invention as described herein include the provision of an advantageous manner of producing meta-nitro-benzyl chlorides by reacting the corresponding nitro aromatic compounds with substantially pure bischloromethyl ether in the presence of oleum-free sulfuric acid; the provision of certain new halogenated meta-nitro-benzyl chlorides; and other objects which will be apparent as details or embodiments of the invention are set forth hereinafter.

In order to facilitate a clear understanding of the invention, the following preferred specific embodiments are described in detail:

*Example 1*

In a suitable reaction vessel, the following mixture: 14,350 parts by weight of 96% sulfuric acid, 1,750 parts of nitro-benzene, and 670 parts of substantially pure bischloromethyl ether was maintained at 45–50° C. for one week, and then drowned in crushed ice. The aqueous layer was substantially completely decanted from the organic layer, resulting from settling the mixture, and the organic layer was extracted with benzene. A small amount of a filter-cel type of filter-aid material was added to the benzene solution, and then the latter was filtered with suction through a layer of filter-cel; and this was followed by 4 washes of the filter-cel with benzene. The organic phase was separated from the filtrate, washed with water until neutral, the benzene distilled off, and the remaining material dried over sodium sulfate. The residue was fractionated under vacuum to remove unchanged nitro-benzene, and a meta-nitro-benzyl fraction boiling at 85–87° C. at 0.5 mm. Hg. A 35% yield of this product was obtained, and 42% of the nitro-benzene remained unchanged. Upon crystallization from an equal weight of methanol, the crystalline meta-nitro-benzyl chloride melted at 45–46° C.

*Example 2*

Following the above procedure, the mixture: 5,400 parts by weight of 96% sulfuric acid, 1,371 parts of ortho-nitro-toluene, and 370 parts of substantially pure bischloromethyl ether was maintained for three days, and then the mixture was drowned in crushed ice. Upon settling, the organic layer solidified. The aqueous layer was decanted therefrom, and the solid washed with water. The organic layer material was dissolved in about 2,000 parts by weight of benzene, filtered with the aid of filter-cel, dried over potassium carbonate, and vacuum distilled. The fraction boiling in the range of 87–88° C. at 0.05 mm. Hg was the 3-nitro-4-methyl-benzyl chloride product, and upon crystallization from methanol, it melted at 44–45° C.

*Example 3*

Following the above procedure, the following mixture: 400 parts by weight of 96% sulfuric acid, 172 parts of 2-nitro-6-chloro-toluene, and 65 parts of substantially pure bischloromethyl ether was maintained at 45° C. for one week, and the product recovered as in Example 2. This product boiled at 102° C. at a pressure of 0.01 mm. Hg, and was 3-chloro-4-methyl-5-nitro-benzyl chloride.

*Example 4*

Following the procedure of Example 3, except substituting 2-nitro-4-chloro-toluene instead of the 2-nitro-6-chloro-toluene, 3-chloro-5-nitro-6-methyl-benzyl chloride was prepared, and it had a boiling point of 94–95° C. at 0.02 mm. Hg pressure.

Comparable results to the foregoing are obtained by variations such as the following: About 2 mols of the corresponding nitro aromatic compound is reacted with about 1 mol of the substantially pure bischloromethyl ether, the oleum-free sulfuric acid is desirably of 85 to 100% strength, and preferably of about 95 to 100%. The reaction temperature is in the range of 25 to 75° C., the reaction time is in the range of about 24 to 175 hours, and the amount of the acid is in the range of about 1 to 15 times the weight of the bischloromethyl ether. Generally, higher acid concentrations and higher reaction temperatures are reflected in shorter reaction times.

It is indeed surprising that the process described herein results in such good yields of the meta-nitro-benzyl chlorides, especially in view of prior literature which indicates that the particular sulfuric acid agent should be avoided. In the new halogenated meta-nitro-benzyl chlorides of Examples 3 and 4, the halogen is not in an ortho- or para-position relative to the nitro group; and therefore, the ring halogen is relatively inert in reactions for introducing the substituted benzyl group into a compound by a reaction involving the side-chain chlorine. In this respect, these compounds are not regarded as equivalent to any halogenated nitro-benzyl chloride wherein the ring halogen such as chlorine is situated in an ortho- or para-position relative to the nitro group, whereby the ring halogen is activated so that it is reactive under conditions for introducing the substituted benzyl group into a compound such as a dyestuff or an intermediate by a reaction intended to involve only the side-chain chlorine. With the latter type halogenated nitro-benzyl compounds, lower yields of the desired reaction product are obtained, and in addition the product may contain very undesirable contaminants the removal of which is very difficult.

This application is a continuation-in-part of application Serial No. 128,916, filed November 22, 1949 and now abandoned.

In view of the foregoing disclosures, variations and modifications of the invention will be apparent to one skilled in the art, and it is intended to include within the invention all such variations and modifications except as do not come within the scope of the appended claims.

I claim:
1. A process for preparing monometa-nitrobenzyl chlorides, selected from the group consisting of meta-nitrobenzyl chloride, meta-nitro-methyl benzyl chlorides, meta-nitrochloro benzyl chlorides and meta-nitro-methyl chloro benzyl chlorides, which comprises reacting two mols of the corresponding nitro aromatic compound which is unsubstituted in at least one position meta to the nitro group, with about one mol of substantially pure bis-chloromethyl ether in the presence of an acid consisting of 85 to 100% sulfuric acid at a temperature in the range of 25 to 75° C., and a time in the range of 24 to 175 hours, the amount of the acid being in the range of 1 to about 15 times the weight of the ether.

2. The method of claim 1 wherein the nitro aromatic compound is nitro-benzene.

3. The method of claim 1 wherein the nitro aromatic compound is ortho-nitro-toluene.

4. The method of claim 1 wherein the nitro aromatic is 2-nitro-6-chloro-toluene.

5. The method of claim 1 wherein the nitro aromatic is 2-nitro-4-chloro-toluene.

References Cited in the file of this patent

Jour. Chem. Soc., London (1920), pp. 510–527, article by Stephen et al.